United States Patent
D'Angelico et al.

(10) Patent No.: US 9,989,398 B2
(45) Date of Patent: Jun. 5, 2018

(54) DEVICE FOR DETERMINING AND/OR MONITORING AT LEAST ONE PREDETERMINED FILL LEVEL

(75) Inventors: Sascha D'Angelico, Rummingen (DE); Sergej Lopatin, Lorrach (DE); Franco Ferraro, Schworstadt (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 525 days.

(21) Appl. No.: 13/817,729

(22) PCT Filed: Jul. 11, 2011

(86) PCT No.: PCT/EP2011/061724
§ 371 (c)(1),
(2), (4) Date: Feb. 19, 2013

(87) PCT Pub. No.: WO2012/022542
PCT Pub. Date: Feb. 23, 2012

(65) Prior Publication Data
US 2013/0139585 A1    Jun. 6, 2013

(30) Foreign Application Priority Data
Aug. 20, 2010   (DE) .................. 10 2010 039 585

(51) Int. Cl.
*G01F 23/22*  (2006.01)
*G01F 23/296*  (2006.01)

(52) U.S. Cl.
CPC .......... *G01F 23/22* (2013.01); *G01F 23/2966* (2013.01); *G01F 23/2967* (2013.01)

(58) Field of Classification Search
CPC ...................................................... G01F 23/22
(Continued)

(56) References Cited

U.S. PATENT DOCUMENTS 4,100,473 A * 7/1978 Lawrenson et al. .......... 318/696
4,197,478 A * 4/1980 Silvus, Jr. ................ 310/316.01
(Continued)

FOREIGN PATENT DOCUMENTS

| CN | 1908597 A | 8/2014 |
| DE | 19720519 A1 | 11/1998 |

(Continued)

OTHER PUBLICATIONS

International Preliminary Report on Patentability in PCT/EP2011/061724, dated Feb. 26, 2013, English translation thereof.
(Continued)

*Primary Examiner* — Peter Macchiarolo
*Assistant Examiner* — Alexander Mercado
(74) *Attorney, Agent, or Firm* — Bacon & Thomas, PLLC

(57) ABSTRACT

A device for determining a predetermined fill level of a liquid in a container, with a sensor unit, comprising a unit capable of oscillating mechanically, a transmitter unit, and a receiver unit, which is electrically and mechanically coupled to the transmitter unit, and which transduces the oscillation of the unit capable of oscillating into an electrical receiving signal. An electronic unit, comprising a regulating unit, which regulates a phase difference that exists between the electrical transmission signal and electrical receiving signal to a determined value at which the unit capable of oscillating conducts oscillations at a resonant frequency, and which forms an oscillation circuit with the transmitter unit, receiving unit and the unit capable of oscillating. The electronic unit comprises a compensation path with a compensation unit, which for compensating additional signal components in the receiving signal, which results from the mechanical and/or electrical coupling between transmitter unit and receiver unit, at least intermittently produces a compensation signal from the transmission signal and supplies this (Continued)

compensation signal to the receiving signal. The compensation unit produces the compensation signal in a way such that the compensation signal is opposite to the additional signal components in the receiving signal.

12 Claims, 4 Drawing Sheets

(58) Field of Classification Search
USPC .................. 73/32 A, 290 V; 702/104, 106
See application file for complete search history.

(56) References Cited

U.S. PATENT DOCUMENTS

| | | | |
|---|---|---|---|
| 4,291,749 A * | 9/1981 | Ootsuka et al. | 165/202 |
| 4,876,879 A * | 10/1989 | Ruesch | 73/32 A |
| 6,647,764 B1 * | 11/2003 | Paul et al. | 73/54.41 |
| 7,158,897 B2 | 1/2007 | Kolosov | |
| 2004/0093941 A1 * | 5/2004 | Lopatin | 73/290 V |
| 2006/0145774 A1 * | 7/2006 | D'Angelico | 331/158 |
| 2007/0029897 A1 | 2/2007 | Wohrle | |
| 2008/0223931 A1 * | 9/2008 | Spiess et al. | 235/439 |
| 2011/0179860 A1 | 7/2011 | Urban | |
| 2011/0267861 A1 * | 11/2011 | Feldtkeller | 363/126 |

FOREIGN PATENT DOCUMENTS

| | | |
|---|---|---|
| DE | 102005036872 A | 2/2007 |
| DE | 102008050266 A1 | 4/2010 |
| EP | 0810423 A2 | 12/1997 |
| EP | 1750104 A2 | 2/2007 |
| GB | 2095842 A * | 10/1982 |
| WO | WO 98/53282 | 11/1998 |

OTHER PUBLICATIONS

International Search Report, Nov. 3, 2011, The Netherlands.
German Search Report, Jun. 29, 2011, German PTO, Munich.

* cited by examiner

Fig. 1
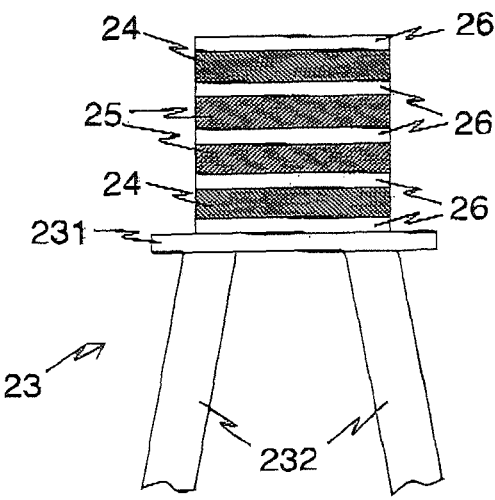
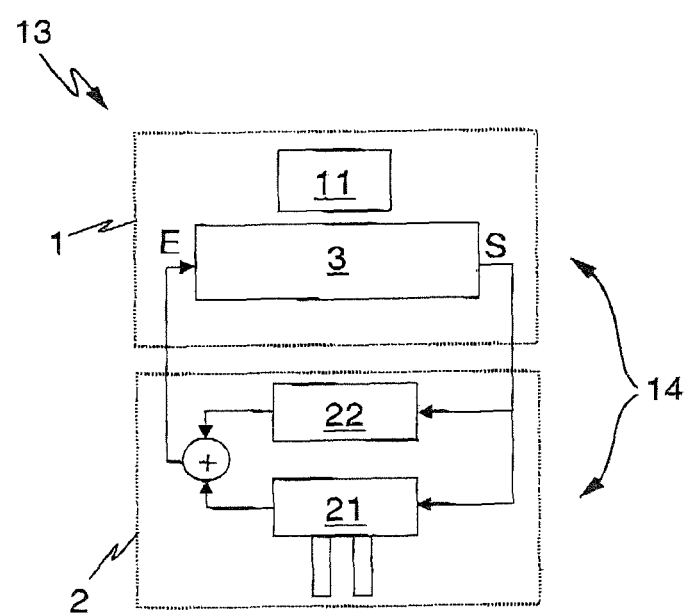
Fig. 2a
(PRIOR ART)

DEVICE FOR DETERMINING AND/OR MONITORING AT LEAST ONE PREDETERMINED FILL LEVEL

TECHNICAL FIELD

The present invention relates to a device for determining and/or monitoring at least one predetermined fill level of a liquid in a container, with a sensor unit. The sensor unit at least comprising a unit capable of oscillating mechanically, which can be arranged at the height of the predetermined fill level, a transmitter unit, which excites the unit capable of oscillating to mechanical oscillation by means of an electrical transmission signal, and a receiver unit, which is electrically and mechanically coupled to the transmitter unit, and which transduces the oscillation of the unit capable of oscillating into an electrical receiving signal, and with an electronic unit, at least comprising an evaluation unit, which determines from the electrical signal whether the unit capable of oscillating is covered or uncovered by the liquid, and a regulating unit, which regulates a phase difference that exists between the electrical transmission signal and the electrical receiving signal to a determined value at which the unit capable of oscillating conducts oscillations at a resonant frequency, and which forms an oscillation circuit with the transmitter unit, the receiving unit and the unit capable of oscillating. In addition to limit fill level, the density and/or the viscosity of the medium is determinable. The unit capable of oscillating is, for example, an oscillatory fork.

BACKGROUND DISCUSSION

In industry, level measuring devices are employed for monitoring a predetermined fill level of a liquid, often for overfill protection and for preventing pumps from running dry. A vibrating limit fill level switch, with which density and viscosity can also be determined, is described, for example, in DE 4419617 C2. Disclosed is a unit capable of oscillating, an electromechanical transducer unit for inciting the unit capable of oscillating to mechanical oscillation by means of electrical transmission signals and for receiving the mechanical oscillation of the unit capable of oscillating and transducing the same into an electrical receiving signal, an evaluation unit, which determines, based on the frequency of the receiving signal, whether the unit capable of oscillating is covered, and a regulating circuit, which regulates a phase difference that exists between the electrical transmission signal and electrical receiving signal to a constant value, wherein the value is selected such that the unit capable of oscillating oscillates at the resonant frequency. In the simplest case, the regulating circuit consists of an amplifier and a phase shifter, wherein the receiving signal is supplied to the amplifier and is fed back to the transmission signal via the phase shifter.

The electromechanical transducer unit is generally formed from one or more piezoelectric elements. In this, either one piezo-element embodies both transmitter and receiver, or a plurality of piezo-elements, which each only form a transmitter or receiver are arranged in a stack.

The unit capable of oscillating, the transducer unit and the regulating circuit form the components of an oscillating system, wherein the components are not fully separated electrically and mechanically so that mechanical and electrical coupling effects arise. These reveal themselves in the form of additional signals in the receiving signal which are superimposed on the measurement signal and, depending on the embodiment of the transducer unit, comprise a phase shift of 0° or 180°, relative to the transmission signal. The measurement signal here has the form of a sine wave, while the additional signals due to coupling are square wave signals.

As long as the unit capable of oscillating oscillates, undamped, at the resonant frequency, the coupling effects are negligible. However, with increasing damping, the amplitude of the actual measurement signal becomes smaller and the superimposed square wave signal gains significance. In this, the phase shift between transmission signal and receiving signal shifts from 90° in the direction of 0° or 180°, respectively. If the coupling dominates, the oscillating system preferably oscillates at a proscribed mechanical cut-off frequency at 0° or 180°, according to the phase shift between coupling and transmission signal. In dependence on the embodiment on the electronics unit, no mechanical cut-off frequency for the respective phase shift exists and the oscillating system no longer oscillates at all. The higher the damping of the oscillation, the earlier mechanical oscillation at the resonance frequency is no longer possible. It is therefore necessary to suppress the coupling as far as possible in order to increase the maximum viscosity at which the unit capable of oscillating is still able to oscillate.

In the prior art, this problem is met by a particular embodiment of the electromechanical transducer which eliminates, firstly, the dependence of the phase difference, to which the resonance frequency corresponds, on the performance of the oscillating system, and secondly, compensates the coupling effects. A solution variant for an electromechanical transducer unit, which consists of a single piezoelectric element, which is simultaneously a transmitter and receiver, is described in EP 0875740 A1. The piezoelectric element is subdivided into three responses, wherein a first and a second region are in reverse polarization with respect to a third region. The first and third regions serve as a transmitter, the second as a receiver. Through the reverse polarization, the two transmission signals are in phase opposition. Thus, the two additional signals due to coupling are, just as the transmission signals, in phase opposition and comprise equal amplitudes so that they mutually compensate each other and the coupling is eliminated. In EP 0875742 A1 a solution is described for the case where an electromechanical unit comprises at least one transmitter and at least one receiver, e.g. piezo-elements arranged in the form of a stack. The solution consists therein, that the receiving signal transmission line is connected to the transmitter transmission line via electrical impedance. This impedance is chosen so that the additional signals that arise due to mechanical and electrical coupling compensate for each other. Both variants solve the problem of coupling by reconfiguring the fork component assembly. Hence, it is not possible to retroactively reconfigure level measuring devices that have conventional transducer units.

SUMMARY OF THE INVENTION

The object of the invention therefor consists in providing a device for fill level limit measurement, which comprises easily retrofittable means, which enable reliable measurement, even at higher viscosity.

The object is achieved for a device, accordingly described in the introduction, in the following way: that the electronic unit comprises a compensation path with a compensation unit, which at least intermittently produces a compensation signal from the transmission signal for compensating additional signal components in the receiving signal, which result from the mechanical and/or electrical coupling between transmitter unit and receiver unit, and supplies this compensation signal to the receiving signal, wherein the compensation unit produces the compensation signal in a way such that the compensation signal is opposite to the additional signal components in the receiving signal. Transmitter unit and receiver unit are subsequently designated in abbreviation by transmitter-/receiver unit. The input signal of the transmitter-/receiver unit furthermore corresponds to the unaltered transmission signal, i.e. only the compensation path transmission signal, provided as input signal, is altered.

At a high damping of the oscillations, the amplitude of the actual receiving signal decreases, so that the components due to the coupling that are independent of the damping increase in importance until, in excess of a certain damping, the receiving signal consists only of components due to coupling. The oscillation frequency is then the lower mechanical cut-off frequency, which is proscribed by the electronic unit. The compensation signal is opposite to the additional signal components due to coupling, i.e. phase shifted by 180°. Through the compensation signal, the additional signal components are at least partially compensated, so that oscillation at a sensor frequency proscribed by the unit capable of oscillating is further possible. The magnitude of the compensation signal is preferably dynamically adaptable and is adjusted in such a way that additional signal components are not fully compensated, given that otherwise in the case where there is complete damping of the unit capable of oscillating by the medium, the oscillator circuit would no longer be capable of oscillating and thereby would never oscillate at the mechanical cut-off frequency.

The device according to the invention differentiates itself from conventional devices for vibrational determination of a limit fill level, the density and/or the viscosity of a medium, only in the embodiment of the electronic unit. These conventional devices can therefore be upgraded, increasing their range of application, by replacing the electronic unit. Vibrating fill level measuring devices are generally constructed modularly so that a replacement of the electronic unit can occur quickly and simply, without having to remove the sensor, i.e. the unit capable of oscillating with the connection to the process, from the process. Additionally, the solution is independent from the embodiment of the electromechanical transducer unit and therefore versatilely employable.

In a first embodiment of the solution according to the invention, the compensation unit modifies the transmission signal in the compensation path in dependence on a current oscillation frequency of the oscillator circuit for producing the compensation signal. The compensation unit produces at least one compensation signal then, if the oscillation frequency does not equal a valid sensor frequency. A valid sensor frequency is a frequency in a range that it bounded by an oscillation frequency of an uncovered unit capable of oscillating and an oscillation frequency of a covered unit capable of oscillating, each with certain tolerances. If the unit capable of oscillating is not able to oscillate, by way of example because of too much damping or because the medium is too viscose or due to a blockage in the unit capable of oscillating, then the frequency of the oscillator circuit lies outside of this range. So, the oscillator circuit oscillates with one of the upper or lower proscribed mechanical cut-off frequencies, which are independent of the sensor unit, or it does not oscillate at all.

According to an embodiment of the device, the compensation unit comprises at least one adjustable damping element. Another embodiment is herewith connected according to which the damping element is a voltage divider or amplifier. The amplitude of the compensation signal produced in the compensation path is thereby adjustable so that the required compensation can be adjusted for each boundary condition. The required magnitude of compensation is dependent, by way of example, on the ambient temperature or ambient pressure and changes, furthermore, over the operating life of the device due age related effects. With a dynamic compensation, wherein the magnitude of the compensation is not fixed, rather is increased continuously or discretely, the unit capable of oscillating begins to oscillate again at the resonance frequency with the suitable compensation magnitude, as far as the reason for the oscillation at the mechanical cut-off frequencies, i.e. the interruption of the oscillation, was too much damping of the oscillation, i.e. the viscosity was too high.

Comprised in an advantageous further embodiment, the damping element comprises a plurality of damping levels. The damping levels are realized through single resistors that can be switched on, by way of example, or, adjusting the level of damping can occur digitally. In the last case, the level of damping can be adjusted in a continuous way.

In an embodiment of the device according to the invention, the compensation unit comprises an inverting element. This is preferably arranged before the damping element. In accordance with the embodiment of the transmitter-/receiver unit, the signal components due to coupling comprise a phase shift of 0° or 180° relative to the transmission signal so that an inverted transmission signal may be required for the compensation of said signal components due to coupling. In order to guarantee a high level of flexibility, the inverting element can also be switched on, depending on the embodiment of the transmitter-/receiver unit.

A further object of the invention is to provide a method, for compensating additional signal components in the receiving signal, for a device of the sort described in the introduction, wherein the additional signal components result from the mechanical and/or electrical coupling between transmitter unit and receiver unit.

The object is thereby achieved in that a compensation signal is produced, at least intermittently, from the transmission signal and is opposite to the additional signal components that result from the coupling, and in that the compensation signal is supplied to the receiving signal.

According to a first embodiment of the method according to the invention, the transmitted signal is amplified by an adjustable amplification factor and is supplied to the receiving signal. The amplification factor is generally negative so that the transmission signal used for producing the compensation signal is damped. In an embodiment of the method, the transmitted signal for producing the compensation signal is inverted. Whether an inversion is required, is dependent on the phase shift of the additional signal components relative to the transmitted signal. The compensation signal is produced in every case such that it is phase shifted 180° relative to the additional components due to coupling. The supplying of the compensation signal occurs, by way of example, via an adding component introduced into the regulating circuit or contactlessly, e.g. via a capacitor. The compensation can be dynamically adapted through an adjustable amplification factor. The required level of compensation, at a specific damping from the medium, is dependent on, by way of example, the ambient temperature, the pressure or old age symptoms of the device. The compensation is adaptable to the current requirements through an adjustable amplification factor, so that suitable compensation can be adjusted to at all times.

A further embodiment of the method provides that the current oscillation frequency of the oscillating circuit is determined, so that in the case where the oscillation frequency corresponds to a valid sensor frequency, dedicated to a covered or uncovered unit capable of oscillating, no compensation takes place. The compensation path is then, by way of example, disconnected or switched off, or the transmitted signal is damped to such an extent that at the output of the compensation path, the compensation signal is negligible. If the sensor frequency is a valid sensor frequency, then at least one process variable, which is to be determined, can be determined. As long as the oscillation frequency corresponds to a valid sensor frequency, then no compensation is required. However, the compensation can also depend on the previous history. In an embodiment, in the case where the oscillation began again due to the compensation, the compensation adjusted to is retained.

A further embodiment comprises that the current oscillation frequency of the oscillating circuit is determined, so that in the case where the oscillation frequency corresponds to a non-valid sensor frequency, dedicated to a covered or uncovered unit capable of oscillating, the compensation is adjusted to the lowest possible level of compensation, and that the level of compensation is increased until the oscillation frequency corresponds to a valid sensor frequency, or, in case no valid sensor frequency is achieved, until the highest possible level of compensation is achieved or the oscillation frequency corresponds to an upper mechanical cut-off frequency proscribed by the electronic unit. As long as the compensation signal comprises a small signal amplitude as the signal component due to coupling, an under compensation takes place and a further increase of the compensation is possible since the maximum possible compensation is not yet achieved. The compensation signal and the signal component due to coupling in the receiving signal comprise a phase shift relative to each other of 180°; the signal component due to coupling and the transmitted signal comprise a phase shift of 0° or 180°. In the case of over compensation, the compensation signal dominates, so that a phase shift of 180° or 0° is present between transmitted signal and receiving signal. In the case of a completely damped unit capable of oscillating, a phase shift likewise of 180° or 0° is adjusted to, and thereby to an upper mechanical cut-off frequency with this accompanying phase shift, via a regulating unit, as far as the oscillation at the upper mechanical cut-off frequency is possible.

According to an embodiment of the method, the compensation is ended as soon as the highest possible level of compensation is adjusted to and no valid sensor frequency is achieved, or the upper mechanical cut-off frequency proscribed by the electronic unit is achieved. In an alternative embodiment the compensation is conducted in the reverse direction, i.e. beginning with the highest possible compensation, the compensation is continually decreased until the compensation is switched off. In both embodiments a renewed compensation sweep can follow.

In an embodiment of the method, the level of compensation is maintained as soon as the oscillation frequency corresponds to a valid sensor frequency. In an alternative embodiment, the compensation is ended as soon as the oscillation frequency corresponds to a valid sensor frequency, or the level of compensation is gradually decreased, so that only the minimum required compensation is carried out. The oscillation frequency again springs to an invalid sensor frequency or the oscillation times out, then the compensation is again resumed and the compensation is increase, respectively.

BRIEF DESCRIPTION OF THE DRAWINGS

The invention is further described in reference to the following figures. Equivalent parts in the figures are hereby each designated by the same reference characters.

FIG. 1 shows the schematic construction of a sensor unit;

FIG. 2a schematically shows the components of an oscillation system according to the prior art;

DETAILED DISCUSSION IN CONJUNCTION WITH THE DRAWINGS

Figure 2B:
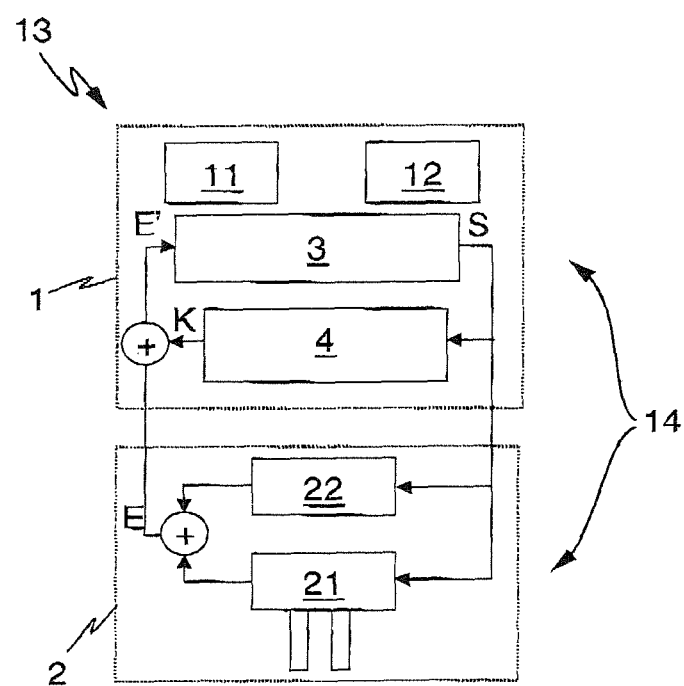
FIG. 2b schematically shows the components of an oscillation system according to the invention.

In FIG. 1 an example of a sensor unit 2 is depicted, which can be both constituent parts of a fill level measuring device of the prior art as well as a fill level measuring device according to the invention. The unit capable of oscillating 23 takes the form here of a fork with two teeth 232, wherein the teeth 232 are arranges on a membrane 231. The membrane 231 forms, by way of example, the seal of a tube shaped housing, wherein the transmitter-/receiver unit is arranged. The transmitter-/receiver unit here consists of a plurality of piezoelectric elements arranged in a stack. The inner two piezoelectric elements form the transmitter unit 25, which excites the mechanical unit capable of oscillating 23 to oscillate. The two outer elements serve as a receiver unit 24 and produce an electric receiving signal E from the received mechanical oscillations. The piezoelectric elements of transmitter unit 25 and receiver unit 24 each comprise two electrodes, which are arranged on opposite surfaces of the piezoelectric elements. The individual piezoelectric elements are electrically separates from each other through isolation 26. In other embodiments transmitter unit 25 and receiver unit 24 are not formed separately, rather, a single piezoelectric element forms both the transmitter unit 24 and the receiver unit 24. The invention comprises both variants.

In FIG. 2a and FIG. 2b, the components of an oscillation system of a device for vibrational limit fill level measurement are schematically depicted, wherein FIG. 2a shows the oscillation system of a known device from the prior art and FIG. 2b shows the oscillation system 13, including oscillation circuits 14, of a device according to the invention. The oscillation system 13 is formed by the sensor unit 2 and the regulating circuit. Mechanically, the sensor unit 2 consists of two components: the unit capable of oscillating 23 and the transmitter-/receiver unit 24,25. The transmitter-/receiver unit 24, 25 is connected with the electronic unit 1 via input leads, wherein the electronic unit comprises among other things a regulating unit 3 with components for adjusting the phase shift between transmitter signal S and receiving signal E, i.e. for producing the transmitter signal S, and an evaluation unit 11. In addition to the mechanical components 21, the sensor unit 2 comprises still a further component, the coupling 22. This arises on the one hand from the mechanical coupling between transmitter unit 25 and receiver unit 24 and on the other from their electrical coupling through the input leads. The coupling 22 leads to an additional signal component in the form of a square wave voltage in the receiving signal E and is also retained in the transmitted signal S, given that the transmitted signal S is formed through feedback of the amplified and phase shifted receiving signal E.

The electronic unit 1 shown in FIG. 2b comprises, in addition to the evaluation circuit 1 and the regulating unit 3, a compensation unit 4 for producing the transmitted signal S, and a micro controller 12. The transmitted signal S is not only supplied to the sensor unit 2, but also to the compensation unit 4. The compensation unit 4 comprises a plurality of elements arranged in a compensation path, wherein these elements produce a modified transmitted signal and add to the receiving signal E as compensation signal K. This signal sum E' forms the input signal of the regulating circuit and is supplied to the regulating unit 3. The compensation unit 4 modifies the transmitted signal S such that it at least partially compensates the addition to the signal due to the coupling that is retained in the receiving signal E. Ideally a light under compensation occurs, in place of the addition of the signals, the compensation signal K, produced by the compensation unit 4, can also be supplied to the receiving signal E otherwise, capacitively by way of example. It is essential that a superposition of receiving signal E and compensation signal K takes place, so that the compensation signal E, which is phase shifted 180° opposite the addition to the signal due to coupling, can work against the addition to the signal. Control of the compensation unit 4 occurs by means of a microcontroller 12. This initiates and ends the compensation and controls the adjustment of the magnitude of the compensation signal K. Evaluation unit 11 and microcontroller 12 can also be implemented together, i.e. the microcontroller takes on the tasks of the evaluation unit 11. In another embodiment, the compensation unit 4 is embodied digitally, as a microcontroller by way of example.

Figure 3:
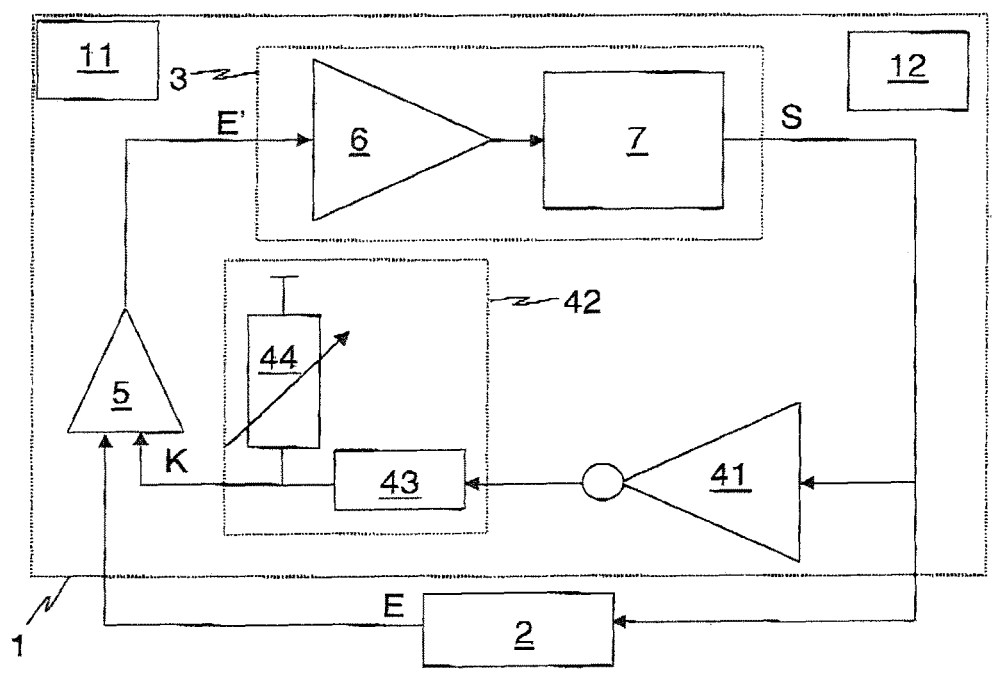
FIG. 3 shows a sketch of the construction of an electronic unit according to the invention.

FIG. 3 shows an advantageous embodiment of the electronic unit 1 for the case where the addition to the signal due to coupling in the receiving signal E comprises a phase shift of 180° opposite the transmitted signal S. The regulating unit 3 comprises an amplifier 6 for producing the transmitted signal S from the modified receiving signal E', as well as a phase shifter. The compensation unit 4 comprises an inverter 41 and a voltage divider 42. The transmitted signal is supplied to the inverter 41, which produces an inverted transmitted signal. The inverted transmitted signal is supplied to the voltage divider 42 which damps the inverted transmitted signal by an adjustable damping factor. Thus, the voltage divider consists of a fixed resistance 43 and an adjustable resistor 44. The damping factor is adjusted by means of the adjustable resistor 44 and the adjustment is controlled by the micro controller. The compensation signal K produced in this way is coupled onto the receiving signal E via and adder 5.

Figure 4:
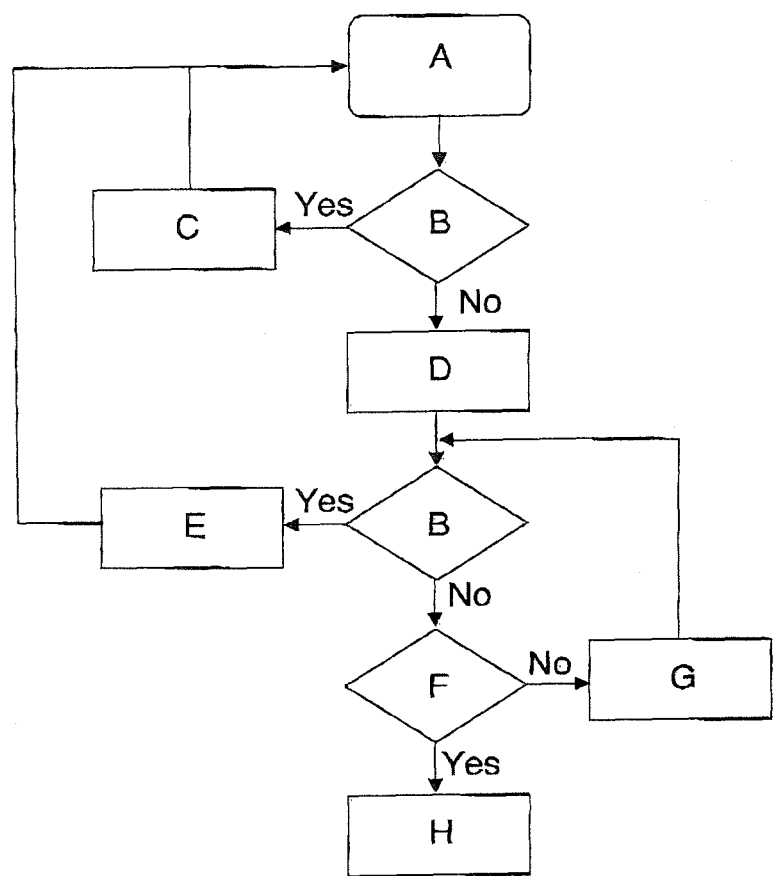
FIG. 4 shows a flow diagram of the compensation method.

FIG. 4 discloses a flow diagram of an embodiment of the method for carrying out the compensation. In a first step A, the current oscillation frequency is determined. This occurs, by way of example, in the evaluation unit or in a micro controller.

In the next step B it is inspected whether the oscillation frequency corresponds to a valid sensor frequency, i.e. whether the oscillation frequency lies within a region between a minimum frequency dedicated to a covered state and a maximum frequency dedicated to an uncovered state.

Step C is carried out if the result of the inspection is positive. If the oscillation frequency corresponds to a valid sensor frequency, then no compensation is required. Here, by way of example, the damping element is adjusted such that the compensation signal becomes zero. The receiving signal is then supplied to the regulating unit unaltered.

Step D is carried out as the corresponding alternative to step C if it turns out that the oscillation frequency does not correspond to a valid sensor frequency. A proscribed level of damping is adjusted to, so that a compensation signal of a suitable magnitude arises. In a preferable embodiment, a high damping is begun with so that a compensation signal of negligible magnitude is produced and then in following steps the damping is continually decreased. In this way, an over compensation should be avoided.

A new inspection according to step B follows the adjustment of the compensation unit. If the compensation signal produced is sufficient in order to enable oscillation at the sensor frequency proscribed by the sensor, the compensation can be ended in step E. Either the compensation is ended immediately or the compensation signal is gradually decrease as far as possible so that in the ideal case, compensation likewise no longer takes place. In an alternative embodiment, the compensation is continued with the level of damping adjusted to.

If the result of the new inspection according to step B is that the oscillation frequency still does not correspond to a valid sensor frequency, then it is inspected in step F whether the current oscillation frequency corresponds to the upper mechanical cut-off frequency, and/or whether the compensation is already at a maximum, i.e. whether the smallest possible damping is adjusted to. If the swing frequency corresponds to the upper mechanical cut-off frequency then an over compensation is present. If one of the two inspections in step F returns positive, then no further compensation is possible. Alternatively, the receiving signal and the phase shift can be measured and it can be determined from this whether an over compensation is present.

Thus, in step H the compensation is ended. In an embodiment, the compensation is the carried out anew, wherein the smallest compensation is again begun with. In an embodiment, an error message is produced in step H. If the compensation does not function, this can be caused by damage to electrical lines or—in particular in the case of an oscillating fork—by a blockage of the unit capable of oscillating, so that maintenance of the device is required. In a modification of the method not depicted here, the compensation is successively decreased again if the upper mechanical cut-off frequency is detected or if, in general, an over compensation is present.

If the inspection in step F returns negative, this means that an under compensation is present that is not sufficient to again establish the oscillation at a resonance frequency of the unit capable of oscillating. Thus, in step G, the compensation is further increased, i.e. the damping of the, as the case may be, inverted transmitted signal in the compensation path is decreased, so that a higher compensation signal is produced. An inspection according to step B follows anew. The steps F, G and B are repeated so long until a valid sensor frequency is achieved so that step E can be continued on with, or until the inspection in step F returns positive, i.e. no more compensation is possible and step H follows.

The invention claimed is:

1. A device for determining and/or monitoring at least one predetermined fill level of a liquid in a container, with a sensor unit, at least comprising:
   a mechanical unit capable of executing a mechanical oscillation, which is arrangeable at a height of the predetermined fill level;
   a transmitter unit, which excites said mechanical unit capable of oscillating to said mechanical oscillation by means of an electrical transmission signal;
   a receiver unit, which is electrically and mechanically coupled to said transmitter unit, and which transduces said oscillation of said mechanical unit capable of oscillating into an electrical receiving signal; and an electronic unit, at least comprising an evaluation unit, which determines from the electrical receiving signal whether said mechanical unit capable of oscillating is covered or uncovered by a filling material, and a regulating unit, which regulates a phase difference that exists between the electrical transmission signal and electrical receiving signal to a determined value at which said mechanical unit capable of oscillating conducts oscillations at a resonant frequency, and which forms an oscillation circuit with said transmitter unit, said receiving unit and said mechanical unit capable of oscillating, wherein:

said electronic unit comprises a compensation path with a compensation unit, which compensation unit at least intermittently produces a compensation signal from the transmission signal for compensating additional signal components in the receiving signal, which result from the mechanical and/or electrical coupling between said transmitter unit and said receiver unit, wherein the compensation unit supplies this compensation signal to the receiving signal;

said compensation unit produces the compensation signal such that the compensation signal is opposite to the additional signal components in the said receiving signal; and said compensation unit comprises at least one adjustable damping element for adjusting the magnitude of the compensation signal, the compensation unit is controlled by a microcontroller which is embodied to initiate and end the compensation, and to control the adjustment of the magnitude of the compensation signal, wherein the evaluation unit or the microcontroller is embodied to determine a current oscillation frequency, and said compensation unit is embodied to modify the transmission signal in the compensation path in dependence on the current oscillation frequency, wherein the compensation unit produces the compensation signal at least then, if the oscillation frequency does not correspond to a frequency within a region between a minimum frequency dedicated to a covered state and a maximum frequency dedicated to an uncovered state.

2. The device according to claim 1, wherein:
said compensation unit modifies said electric transmission signal in the compensation path in dependence on a current oscillation frequency of an oscillation circuit for producing the compensation signal.

3. The device according to claim 1, wherein:
said adjustable damping element is a voltage divider or amplifier.

4. The device according to claim 1, wherein:
said adjustable damping element comprises a plurality of damping levels.

5. The device according to claim 1, wherein:
said compensation unit comprises an inverting element.

6. A method for compensating additional signal components in the receiving signal, for a device according to claim 1, where the additional signal components result from the mechanical and/or electrical coupling between transmitter unit and receiver unit, wherein a compensation signal is produced, at least intermittently, from the transmission and is opposite to the additional signal components that result from the coupling, and the compensation signal is supplied to the receiving signal;

wherein the amplitude of the compensation signal is adjustable;

wherein a current oscillation frequency is determined;

wherein the compensation signal is produced in dependence on the current oscillation frequency of the oscillator circuit; and wherein the compensation unit produces the compensation signal at least then, if the oscillation frequency lies outside a region between a minimum frequency dedicated to a covered state and a maximum frequency dedicated to an uncovered state.

7. The method according to claim 6, wherein:
said electrical transmission signal is amplified by an adjustable amplification factor and the amplified transmission signal is supplied to said receiving signal.

8. The method according to claim 6, wherein:
said electrical transmission signal is inverted, is amplified by an adjustable amplification factor and the inverted and amplified transmission signal is supplied to the receiving signal.

9. The method according to claim 6, wherein:
the current oscillation frequency of the oscillation circuit is determined, so that in the case where the oscillation frequency corresponds to a valid sensor frequency, corresponding to said unit capable of oscillating being covered or uncovered, no compensation takes place.

10. The method according to claim 6, wherein:
the current oscillation frequency of the oscillator circuit is determined, so that in the case where the oscillation frequency corresponds to a non-valid sensor frequency, corresponding to a covered or uncovered unit capable of oscillating, a required magnitude of compensation is adjusted by adjusting the amplitude of the compensation signal produced in the compensation path, wherein:

the required magnitude of compensation is adjusted to the lowest possible magnitude of compensation, and the required magnitude of compensation is increased until the oscillation frequency corresponds to a valid sensor frequency, or, in case no valid sensor frequency, is achieved, until the highest possible magnitude of compensation is achieved or the oscillation frequency corresponds to an upper mechanical cut-off frequency proscribed by the electronic unit.

11. The method according to claim 6, wherein:
the compensation is ended as soon as a highest possible magnitude of compensation is achieved and no valid sensor frequency, corresponding to a covered or uncovered unit capable of oscillating, is achieved, or the upper mechanical cut-off frequency proscribed by the electronic unit is achieved.

12. The method according to claim 10, wherein:
the magnitude of compensation adjusted to is maintained as soon as the oscillation frequency corresponds to a valid sensor frequency, corresponding to a covered or uncovered unit capable of oscillating.

* * * * *